(12) United States Patent
Kawachi

(10) Patent No.: US 11,400,770 B2
(45) Date of Patent: Aug. 2, 2022

(54) PNEUMATIC TYRE

(71) Applicant: SUMITOMO RUBBER INDUSTRIES, LTD., Kobe (JP)

(72) Inventor: Takahiro Kawachi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 231 days.

(21) Appl. No.: 16/486,536

(22) PCT Filed: Feb. 21, 2018

(86) PCT No.: PCT/JP2018/006232
§ 371 (c)(1),
(2) Date: Aug. 16, 2019

(87) PCT Pub. No.: WO2018/163825
PCT Pub. Date: Sep. 13, 2018

(65) Prior Publication Data
US 2019/0366781 A1   Dec. 5, 2019

(30) Foreign Application Priority Data
Mar. 6, 2017   (JP) .............................. JP2017-041888

(51) Int. Cl.
*B60C 19/00*   (2006.01)
(52) U.S. Cl.
CPC .................................. *B60C 19/002* (2013.01)
(58) Field of Classification Search
CPC ............ B60C 19/00; B60C 5/00; B29C 73/16
See application file for complete search history.

(56) References Cited

U.S. PATENT DOCUMENTS

| 2005/0161138 A1* | 7/2005 | Yukawa | B60C 11/0318 |
| | | | 152/450 |
| 2007/0131327 A1* | 6/2007 | Yukawa | B60C 19/002 |
| | | | 152/450 |
| 2010/0038005 A1* | 2/2010 | Aoki | B60C 17/065 |
| | | | 152/450 |
| 2017/0306123 A1* | 10/2017 | Uno | C08L 21/00 |
| 2020/0094630 A1* | 3/2020 | Zebian | B60C 19/002 |

FOREIGN PATENT DOCUMENTS

| JP | 4960626 B2 | 6/2012 | |
| WO | 2017163219 | * 3/2017 | ............. B60C 19/00 |

OTHER PUBLICATIONS

International Search Report, issued in PCT/JP2018/006232, PCT/ISA/210, dated May 29, 2018.
Written Opinion of the International Searching Authority, issued in PCT/JP2018/006232, PCT/ISA/237, dated May 29, 2018.

* cited by examiner

*Primary Examiner* — Jeffrey M Wollschlager
*Assistant Examiner* — Shibin Liang
(74) *Attorney, Agent, or Firm* — Birch, Stewart, Kolasch & Birch, LLP

(57) ABSTRACT

A pneumatic tyre (1) for decreasing running noise in a low temperature environment includes a noise damper (20) made of a porous material and fixed to a tyre inner cavity surface (16) of a tread portion (2). In the noise damper (20), hardness under a 25% compression load measured in accordance with Japanese Industrial standard JIS K6400-2 in an atmosphere of −60 degrees Celsius is 110 kPa or less.

16 Claims, 2 Drawing Sheets

PNEUMATIC TYRE

TECHNICAL FIELD

The present invention relates to a pneumatic tyre in which a noise damper is disposed on a tyre inner cavity surface.

BACKGROUND ART

Patent Literature 1 listed below has proposed a pneumatic tyre in which the noise damper made of a porous material is fixed to the tyre inner cavity surface. The noise damper can absorb cavity resonance noise in a tyre inner cavity. Thereby, the pneumatic tyre disclosed in the Patent Literature 1 listed below can decrease running noise.

Patent Literature 1: Japanese Patent No. 4960626

DISCLOSURE OF THE INVENTION

Problem to be Solved by the Invention

The noise damper may be hardened in a low temperature environment.

The hardened noise damper is difficult to absorb air, therefore, there is a problem that the absorption effect of the cavity resonance noise is decreased.

The present invention was made in view of the above, and a primary object thereof is to provide a pneumatic tyre capable of suppressing the running noise even under the low temperature environment.

Means for Solving the Problem

In the present disclosure, a pneumatic tyre includes a noise damper made of a porous material and fixed to a tyre inner cavity surface, wherein in the noise damper, hardness under a 25% compression load measured in accordance with Japanese Industrial standard JIS K6400-2 in an atmosphere of −60 degrees Celsius is 110 kPa or less.

In the pneumatic tyre according to the present disclosure, in the noise damper, the hardness under the 25% compression load measured in accordance with the Japanese Industrial standard JIS K6400-2 in the atmosphere of −60 degrees Celsius may be 90 kPa or less.

In the pneumatic tyre according to the present disclosure, in the noise damper, air permeability measured in accordance with Japanese Industrial standard JIS L1096 may be 14 cm3/cm2/s or less.

In the pneumatic tyre according to the present disclosure, the noise damper may have closed cells, and the number of the cells may be 55 or less per 25 mm.

In the pneumatic tyre according to the present disclosure, a total volume of the noise damper may be 0.1% or more and 20% or less of a total volume of a tyre inner cavity.

Advantageous Effects of the Invention

In the pneumatic tyre according to the present disclosure, the noise damper made of the porous material is fixed to the tyre inner cavity surface. The noise damper can absorb the cavity resonance noise in the tyre inner cavity. Thereby, the pneumatic tyre according to the present disclosure can decrease the running noise.

In the noise damper, the hardness under the 25% compression load measured in accordance with the Japanese Industrial standard JIS K6400-2 in the atmosphere of −60 degrees Celsius is set to be 110 kPa or less. The noise damper configured as such maintains the property of absorbing air even in a low temperature environment. Thereby, the noise damper can absorb the cavity resonance noise in the tyre inner cavity. Therefore, the pneumatic tyre according to the present disclosure can decrease the running noise even in a low temperature environment.

DESCRIPTION OF THE REFERENCE SIGNS 1 pneumatic tyre
2 tread portion
16 tyre inner cavity surface
20 noise damper

BEST MODE FOR CARRYING OUT THE INVENTION

An embodiment of the present invention will now be described below in detail.

Figure 1:
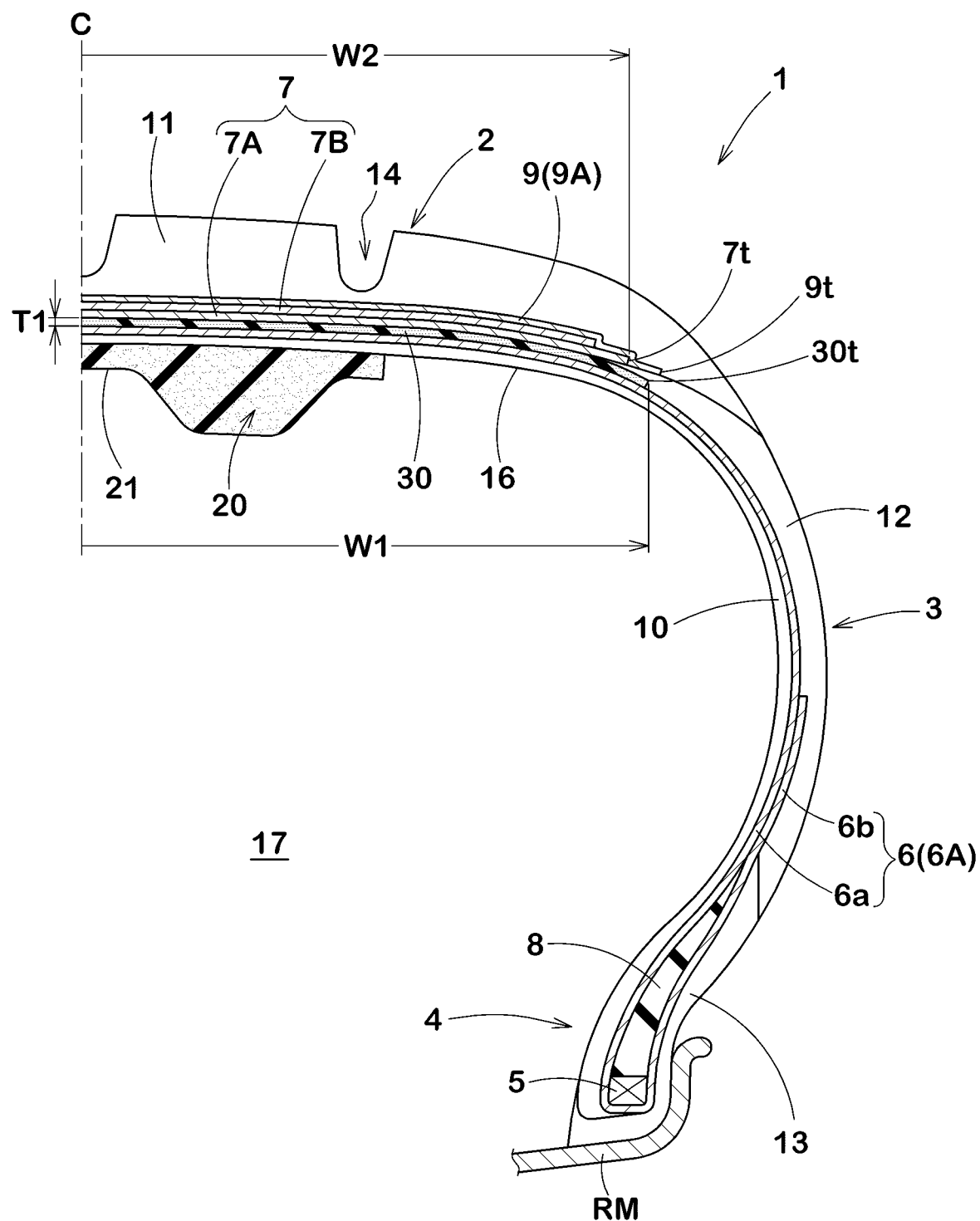
FIG. 1 a cross-sectional view of a pneumatic tyre according to an embodiment of the present disclosure.

FIG. 1 is a tyre meridian section passing through a tyre rotational axis of a pneumatic tyre (hereinafter, may be simply referred to as a "tyre") 1 in this embodiment in a standard state. The standard state is a state in which the tyre is mounted on a standard rim (RM), inflated to a standard inner pressure, and loaded with no tyre load. Hereinafter, dimensions and the like of various parts of the tyre 1 are those measured under the standard state, unless otherwise noted.

The "standard rim" is a wheel rim specified for the concerned tyre by a standard included in a standardization system on which the tyre is based, for example, the "normal wheel rim" in JATMA, "Design Rim" in TRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. when the tyre is for a passenger car, it is set to 200 kPa uniformly in consideration of the actual use frequency and the like.

As shown in FIG. 1, the tyre 1 in this embodiment is suitably used as a radial tyre for a passenger car, for example. The tyre 1 includes a carcass 6, a belt layer 7, a band layer 9, an inner liner 10, and a noise damper 20.

The carcass 6 extends between a pair of bead portions 4, 4. The carcass 6 is formed by at least one, one in this embodiment, carcass ply (6A). The carcass ply 6A includes a main body portion (6a) extending between bead cores 5 of the bead portions 4 via a tread portion 2 and sidewall portions 3 and turned up portions (6b) connected with the main body portion (6a) and each being turned up around a respective one of the bead cores 5 from an inner side to an outer side in a tyre axial direction. Between the main body portion (6a) and each of the turned up portions (6b), a bead apex rubber 8 extending outwardly in a tyre radial direction from a respective one of the bead cores 5 is arranged.

The carcass ply (6A) is formed of carcass cords (not shown) arranged at angles of 80 degrees or more and 90 degrees or less with respect to a tyre equator (C), for example. For the carcass cords, organic fiber cords such as aromatic polyamide and rayon are used, for example.

On an outer side of the carcass 6, a tread rubber 11 arranged in the tread portion 2, sidewall rubbers 12 each forming an outer surface of a respective one of the sidewall portions 3, and bead rubbers 13 forming an outer surface of a respective one of the bead portions 4 are arranged. An outer surface of the tread rubber 11 is provided with grooves 14 recessed inwardly in the tyre radial direction.

The belt layer 7 is arranged on the outer side in the tyre radial direction of the carcass 6 and inside the tread portion 2. The belt layer 7 in this embodiment is formed by two belt plies 7A and 7B. In each of the belt plies 7A and 7B, belt cords (not shown) are arranged at angles of 10 degrees or more and 35 degrees or less with respect to a tyre circumferential direction, for example. These belt plies 7A and 7B are overlapped with each other in such a manner that the belt cords cross each other. For the belt cords, steel, aramid, rayon or the like can be used, for example.

The band layer 9 is arranged on the outer side in the tyre radial direction of the belt layer 7. The band layer 9 in this embodiment includes a band ply (9A) in which band cords (not shown) are spirally wound at angles of 10 degrees or less, preferably 5 degrees or less with respect to the tyre circumferential direction. For the band cords, organic fiber cords, such as nylon cords, can be used, for example.

The inner liner 10 is arranged on the inner side in the tyre radial direction of the carcass 6. This inner liner 10 forms a tyre inner cavity surface 16. The inner liner 10 is made of an air impermeable butyl rubber, for example.

The noise damper 20 is made of a porous material having a large number of pores (cells) on the surface. This noise damper 20 is fixed to the tyre inner cavity surface 16 of the tread portion 2. The noise damper 20 is formed in an elongated belt shape and extends in the tyre circumferential direction. The noise damper 20 has a bottom surface to be fixed to the tyre inner cavity surface 16. In the noise damper 20 in this embodiment, a pair of outer end portions (not shown) arranged on both sides in the tyre circumferential direction are butted each other. Thereby, the noise damper 20 is formed in a substantially annular shape. Note that the pair of the outer end portions may be spaced apart in the tyre circumferential direction.

As the porous material, a porous sponge material is exemplified. The sponge material is a spongy porous structure body. Further, as the sponge material, a so-called sponge itself made of foamed rubber or foamed synthetic resin may be used, or a material made of an animal fiber, a vegetable fiber, or a synthetic fiber and the like integrally interwoven may be used, for example.

The noise damper 20 in this embodiment has substantially the same cross-sectional shape at an arbitrary position in the tyre circumferential direction except for the outer end portions (not shown). Further, in order to prevent collapse and deformation during running, the noise damper is formed so as to have a flat and horizontally elongated cross-sectional shape in which a height in the tyre radial direction is smaller than a width in the tyre axial direction. Furthermore, on a side of an inner surface in the tyre radial direction of the noise damper 20, a concave groove 21 extending continuously in the tyre circumferential direction is provided.

The noise damper 20 configured as such absorbs air in a tyre inner cavity 17 by the pores (cells) on the surface and inside of the noise damper, therefore, it is possible that vibration energy of the vibrating air is converted into thermal energy and consumed. Thereby, the noise damper 20 decreases sound (cavity resonance energy), therefore, it is possible that the cavity resonance noise (running noise in the vicinity of 250 Hz, for example) in the tyre inner cavity 17 is absorbed. Further, the porous material (sponge material, for example) forming the noise damper 20 is easy to deform such as shrink, bend, or the like. Thereby, it is possible that the noise damper 20 deforms flexibly following the deformation of the inner liner 10 during running.

In order to effectively suppress cavity resonance in the tyre inner cavity 17, it is preferred that a total volume v1 of the noise damper 20 is 0.1% or more and 20% or less of a total volume v2 of the tyre inner cavity 17. The total volume v1 of the noise damper 20 is an apparent total volume of the noise damper 20, which means the volume determined from the outer shape including the internal pores (cells). The total volume v2 of the tyre inner cavity 17 is approximately obtained by the following expression (2) in the standard state.

$$V2 = A \times \{(Di-Dr)/2 + Dr\} \times \pi \quad (2)$$

Here,

A: a lateral cross sectional area of the tyre inner cavity obtained by CT scanning a tyre/rim assembly Di: a maximum outer diameter of the inner cavity surface of the tyre Dr: a diameter of the rim π: the circumference ratio Note that when the total volume v1 of the noise damper 20 is less than 0.1% of the total volume v2 of the tyre inner cavity 17, it is possible that the vibration energy of the air is not sufficiently converted into the thermal energy. From such a point of view, it is more preferred that the total volume v1 of the noise damper 20 is 10% or more of the total volume v2 of the tyre inner cavity 17. On the other hand, when the total volume V1 of the noise damper 20 is more than 20% of the total volume V2 of the tyre inner cavity 17, it is possible that the weight and the manufacturing cost of the tyre 1 is increased. From such a point of view, it is more preferred that the total volume V1 of the noise damper 20 is 15% or less of the total volume V2 of the tyre inner cavity 17.

In the noise damper 20 in this embodiment, hardness under a 25% compression load in an atmosphere of −60 degrees Celsius (hereinafter, may be simply referred to as "hardness under a 25% compression load") is limited to 110 kPa or less. The hardness under 25% compressive load (25% CLD) is measured in accordance with Japanese Industrial Standard JIS K6400-2. In this embodiment, first, a test piece (240×240×45 mm) taken from the noise damper 20 fixed to the tyre 1 is left in an atmosphere of −60 degrees Celsius for 10 minutes. After that, in accordance with Japanese Industrial Standard JIS K6400-2: 2012, method D of paragraph 6 "hardness test", the hardness under a 25% compression load is measured by compressing the test piece for 20 seconds at a constant compression of 25% by using a testing machine (for example, UFT urethane testing machine (UFT-5KN) available from Japan Instrumentation System Co., Ltd.).

The noise damper 20 configured as such is difficult to get hardened in a low temperature environment, therefore, the property of absorbing air in the tyre inner cavity 17 is maintained. Thereby, the noise damper 20 can absorb the cavity resonance noise in the tyre inner cavity 17. Therefore, the tyre 1 in this embodiment can decrease the running noise even in a low temperature environment such as a cold region and the like. Note that the hardness of the noise damper 20 can be set by adjusting the viscosity of the raw material of the noise damper 20 or changing the size of the cells (not shown), for example.

In order to exert such an effect effectively, it is more preferred that the hardness under a 25% compression load is 90 kPa or less. Note that even if the hardness under a 25% compression load is low, it is possible that durability of the noise damper 20 is decreased. From such a point of view, the hardness under a 25% compression load is more preferably 50 kPa or more, further more preferably 62 kPa or more.

It is preferred that the noise damper 20 has closed cells (not shown), that is to say isolated cells which are not connected with other cells. In the noise damper 20 configured as such, each cell is isolated, therefore, it has lower water absorbency than the noise damper having open cells. Thereby, the tyre 1 in this embodiment can prevent freezing of the noise damper 20 in a low temperature environment, therefore, it can effectively absorb the cavity resonance noise in the tyre inner cavity 17. Further, the noise damper 20 having closed cells can exert high rigidity as compared to the noise damper having open cells. Therefore, the noise damper 20 can exert high durability.

The number of cells (not shown) can be set as appropriate. Note that if the number of the cells is large, the water absorbency of the noise damper 20 is increased. The noise damper 20 configured as such may not sufficiently prevent the cavity resonance noise in the tyre inner cavity 17 due to freezing in a low temperature environment. On the contrary, even if the number of the cells is small, the characteristic of absorbing air is decreased. The noise damper 20 configured as such may not sufficiently absorb the cavity resonance noise in the tyre inner cavity 17. From such a point of view, the number of the cells is preferably 55 or less per 25 mm (55/25 mm or less), more preferably 51 or less per 25 mm (51/55 mm or less), and preferably 30 or more per 25 mm (30/25 mm or more), more preferably 38/25 mm or more.

The number of the cells is measured in accordance with Annex A of Japanese Industrial Standard JIS K6767 (1999). In this embodiment, the number of the cells per 25 mm of the test piece (50×50×3 mm) obtained from the noise damper 20 fixed to the tyre 1 is measured visually by using a calibrated magnifying device (eg, a digital microscope available from Leica) having a magnification large enough to recognize the cells.

Figure 2:
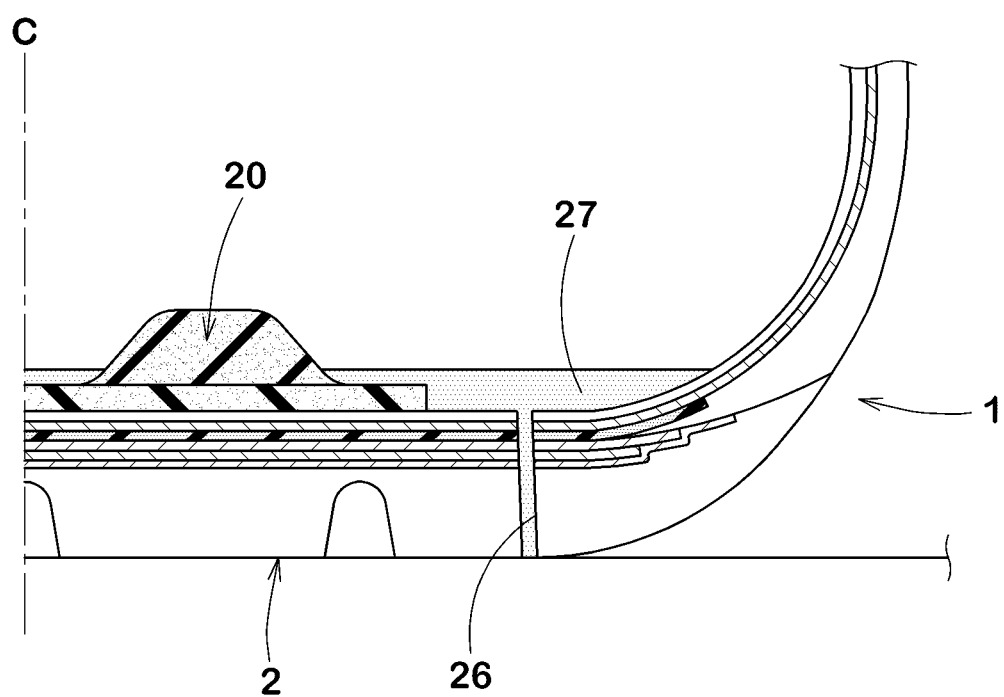
FIG. 2 a cross-sectional view of the pneumatic tyre after a puncture hole formed therein is repaired.

FIG. 2 is a cross-sectional view for explaining the tyre 1 in a state in which a puncture hole 26 is formed and repaired. For puncture repair of the tyre 1 having the noise damper 20, puncture repair liquid 27 for filling the puncture hole 26 is used, for example. When the puncture repair liquid 27 is injected in the tyre inner cavity 17, the puncture hole 26 is filled with the puncture repair liquid 27 and then the puncture hole 26 is sealed.

The noise damper 20 in this embodiment has closed cells (not shown), therefore, the infiltration of the puncture repair liquid 27 into the noise damper 20, that is, the absorption of the puncture repair liquid 27 by the noise damper 20 is suppressed. Thereby, in the tyre 1 in this embodiment, it is possible that puncture is repaired with a small amount of the puncture repair liquid 27.

In order to exert such an effect effectively, it is preferred that air permeability of the noise damper 20 is limited to 14 cm3/cm2/s or less. The air permeability is measured in accordance with Japanese Industrial Standard JIS L1096 (in this embodiment, method A (Frazil method) of JIS L1096). The air permeability in this embodiment is measured by calculating the average value of the amount of air (cm3/cm2/s) passing through each of five test pieces (200×200 mm) taken from different positions in the tyre circumferential direction of the noise damper 20 fixed to the tyre 1. A Frazier type tester is used to measure the air permeability. As the Frazier type tester, FX3345 available from TexTest AG can be used, for example.

As just described, the air permeability of the noise damper 20 is limited to 14 cm3/cm2/s or less, therefore, the infiltration of the puncture repair liquid 27 into the noise damper 20 is effectively suppressed. Note that if the air permeability of the noise damper 20 is more than 14 cm3/cm2/s, the infiltration of the puncture repair liquid 27 into the noise damper 20 may not be sufficiently suppressed. From such a point of view, it is more preferred that the air permeability of the noise damper 20 is 13 cm3/cm2/s or less. Further, if the air permeability of the noise damper 20 is small, the cavity resonance in the tyre inner cavity 17 may not be sufficiently suppressed. From such a point of view, the air permeability of the noise damper 20 is preferably 1.0 cm3/cm2/s or more, more preferably 1.8 cm3/cm2/s or more.

As shown in FIG. 1, the tyre 1 in this embodiment has a damping rubber body 30. The damping rubber body 30 is disposed inside the tread portion 2. The damping rubber body 30 in this embodiment is disposed on the inner side in the tyre radial direction of the belt layer 7. Note that the damping rubber body 30 may be disposed on the outer side in the tyre radial direction of the belt layer 7.

The damping rubber body 30 in this embodiment is disposed between the carcass 6 and the belt layer 7. The damping rubber body 30 in this embodiment is formed of a rubber different from the topping rubber (not shown) included in the carcass ply (6A) and the belt ply (7A).

In this embodiment, hardness (H1) of the damping rubber body 30 is set smaller than hardness (H2) of the tread rubber 11 disposed in the tread portion 2. Here, the "rubber hardness" is the hardness measured in accordance with Japanese Industrial standard JIS K6253 and is the hardness measured by a type-A durometer in an environment of 23 degrees Celsius.

It is possible that the damping rubber body 30 configured as such suppresses vibration of the tread portion 2. Thereby, it is possible that the tyre 1 in this embodiment effectively decreases the running noise (in the vicinity of 160 Hz, for example). Moreover, it is possible that the tyre 1 in this embodiment decreases the running noise in the vicinity of 250 Hz as well by the noise damper 20. Therefore, it is possible that the tyre 1 in this embodiment effectively improves noise performance. Further, the damping rubber body 30 in this embodiment is arranged between the carcass 6 and the belt layer 7, therefore, it is possible that vibration of the carcass 6 and the belt layer 7 is suppressed. Thereby, it is possible that the tyre 1 in this embodiment effectively decreases road noise.

In order to effectively exert the effect described above, it is preferred that a ratio (H1/H2) between the hardness (H1) of the damping rubber body 30 and the hardness (H2) of the tread rubber 11 is set to be 0.5 or more and less than 1.0. Note that if the ratio (H1/H2) is 1.0 or more, the vibration of the tread portion 2 may not be suppressed sufficiently. Conversely, if the ratio (H1/H2) is less than 0.5, the rigidity of the damping rubber body 30 becomes small, therefore, steering stability may not be maintained. From such a point of view, the ratio (H1/H2) is more preferably 0.8 or less and more preferably 0.6 or more.

Further, the hardness (H1) of the damping rubber body 30 and the hardness (H2) of the tread rubber 11 can be appropriately set as long as the ratio (H1/H2) satisfies the above-described range. The hardness (H1) of the damping rubber body 30 in this embodiment is set to be 30 degrees or more and 73 degrees or less. On the other hand, the hardness (H2) of the tread rubber 11 in this embodiment is set to be 55 degrees or more and 75 degrees or less. Thereby, it is possible that the tyre 1 effectively suppresses the vibration of the tread portion 2 while maintaining the steering stability.

A width (w1) and a maximum thickness (T1) of the damping rubber body 30 can be set as appropriate. The width (w1 of the damping rubber body 30 in this embodiment is set to be 60% or more and 130% or less of a width (w2) in the tyre axial direction of the belt layer 7. On the other hand, the maximum thickness (T1) in this embodiment is set to be 4% or more and 20% or less of a maximum thickness (T2) (not shown) of the tread portion 2. Thereby, it is possible that the damping rubber body suppresses the vibration of the tread portion 2 while preventing an increase in the mass of the tyre 1.

A position of an outer end (30t) in the tyre axial direction of the damping rubber body 30 can be appropriately set. The outer end (30t) in this embodiment terminates on an outer side in the tyre axial direction of an outer end (7t) in the tyre axial direction of the belt layer 7 and on an inner side in the tyre axial direction of an outer end (9t) in the tyre axial direction of the band layer 9. Thereby, it is possible that the damping rubber body 30 covers the entire area in the tyre axial direction of the belt layer 7 on the inner side in the tyre radial direction, therefore, it is possible that the damping rubber body 30 effectively decreases the running noise (in the vicinity of 160 Hz, for example).

The damping rubber body 30 in this embodiment is disposed between the carcass 6 and the belt layer 7 as an example, however, the it is not limited to such an embodiment. The damping rubber body 30 may be disposed between the belt layer 7 and the band layer 9, or may be disposed on the outer side in the tyre radial direction of the band layer 9, for example.

While detailed description has been made of the tyre as especially preferred embodiment of the present invention, the present invention can be embodied in various forms without being limited to the illustrated embodiment.

WORKING EXAMPLES (EXAMPLES)

Example A

Tyres having the basic structure shown in FIG. 1 and the noise damper of Table 1 were manufactured, and then their performance was evaluated (Examples 1 to 6). Further, tyres not having the noise damper (Reference 1) were manufactured for comparison, and their performance was evaluated. Furthermore, tyres (Reference 2 and Reference 3) having the noise damper of which hardness under the 25% compression load (25% CLD) measured in accordance with the Japanese Industrial Standard JIS K6400-2 in an atmosphere of −60 degrees Celsius is higher than 110 kPa were manufactured and their performance was evaluated. The specifications common to each of the Examples and the References were as follows.
Tyre size: 165/65R18
Rim size: 18×7JJ
Tyre Inner pressure: 320 kPa
Test vehicle: domestically produced FR car with displacement of 2500 cc Composition of tread rubber:

Natural rubber (TSR20): 15 phr

SBR1 (terminal modified): 45 phr (amount of bound styrene: 28%, vinyl group content: 60%, glass transition point: −25 degrees Celsius)

SBR2 (terminal modified): 25 phr (amount of bound styrene: 35%, vinyl group content: 45%, glass transition point: −25 degrees Celsius)

BR (BR150B): 15 phr

Silane coupling agent (Si266): 4 phr

Resin (SYLVARES SA85 available from Arizona Chemical Co.): 8 phr

Oil: 4 phr wax: 1.5 phr

Age resistor (6c): 3 phr stearic acid: 3 phr zinc oxide: 2 phr vulcanization accelerator (Ns): 2 phr Vulcanization accelerator (DPG): 2 phr carbon black (N220): 5 phr silica (VN3, 1115 MP): 70 phr sulfur: 2 phr Hardness (H2) of tread rubber in vulcanized tyre: 64 degrees Maximum thickness (T2) of tread rubber: 10 mm Composition of damping rubber body Natural rubber (TsR20): 65 phr SBR (Nipol 1502): 35 phr Carbon black N220: 52 phr oil: 15 phr stearic acid: 1.5 phr zinc oxide: 2 phr sulfur: 3 phr vulcanization accelerator (CZ): 1 phr Hardness (H1) of the tyre after vulcanization: 58 degrees Maximum thickness (T1) of damping rubber body: 1 mm Ratio (H1/H2) of hardness (H1) of damping rubber body and hardness (H2) of tread rubber: 0.7

Ratio (w1/w2) of width (w1) of damping rubber body and width (w2) of belt layer: 100%

Test methods were as follows.

<Anti-Noise Performance>

Each of the test tyres was mounted on the above-described tyre rim and mounted on all wheels of the above-described test vehicle under the above-described condition of the tyre inner pressure. A total sound pressure (decibel) of the running noise (frequencies in a range of from 100 to 200 Hz and in a range of from 200 to 300 Hz) was measured by using a sound concentrating microphone attached to the center part of the backrest of the driver's seat while the test vehicle was driven on a road for measuring road noise (rough asphalt surface road) at a speed of 60 km/h under the condition of −60 degrees Celsius of outside temperature. The results are indicated by an index based on the Reference 1 being 100, wherein the larger the numerical value, the smaller the running noise is, which is better.

The test results are shown in Table 1.

TABLE 1

|  | Ref. 1 | Ex. 1 | Ref. 2 | Ref. 3 | Ex. 2 | Ex. 3 | Ex. 4 | Ex. 5 | Ex. 6 |
|---|---|---|---|---|---|---|---|---|---|
| Presence (P) or Absence (A) of Noise damper | A | P | P | P | P | P | P | P | P |
| Air permeability of Noise damper [cm3/cm2/s] | — | 13.0 | 13.0 | 13.0 | 13.0 | 9.3 | 6.5 | 1.8 | 9.3 |
| Hardness of Noise damper (at −60 degrees Celsius under a 25% compression load) [kPa] | — | 105 | 124 | 123 | 106 | 62 | 95 | 83 | 62 |
| Number of Cells [/25 mm] | — | 65 | 66 | 50 | 51 | 38 | 39 | 42 | 38 |
| Ratio (v1/v2) between volume (v1) of Noise damper and Total volume (V2) of Tyre inner cavity [%] | — | 20 | 20 | 20 | 20 | 15 | 10 | 10 | 15 |
| Presence (P) or Absence (A) of Damping rubber body | A | A | A | A | A | A | A | A | P |
| Anti-noise performance [index] | 100 | 117 | 110 | 112 | 136 | 149 | 119 | 126 | 155 |

From the test results, it was confirmed that the tyres in the Examples were able to decrease the running noise under the low temperature environment compared with the tyres in the References.

Example B

Tyres having the basic structure shown in FIG. 1 and the noise damper of Table 1 were manufactured, and then their performance was evaluated (Examples 7 to 19). The specifications common to the Examples are the same as the Example A except for the specifications listed in Table 2. The test methods were the same as in the Example A except for the following methods.

<Easiness of Puncture Repair>

Each of the test tyres was mounted on the above-described rim and punctured by rolling on a nail. Then, each of the test tyres was repaired with the puncture repair liquid (main ingredient: rubber latex), and the time required for the repair was measured. The results are indicated by an index based on the Example 16 being 100, wherein the larger the numerical value, the shorter the repair time, which means that the puncture repair is easier.

<Durability Performance of Noise Damper>

Each of the test tyres was mounted on the above-described tyre rim and inflated to the above-described tyre inner pressure. Then, by using a drum testing machine, a distance until the noise damper and its vicinity were damaged was measured under the conditions of the tyre load of 4.8 kN and the speed of 80 km/h. The results are indicated by an index based on the value of the Example 11 being 100, wherein the larger the numerical value, the higher the durability performance is, which is better.

The test results are shown in Table 2.

TABLE 2

|  | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|
| Presence (P) or Absence (A) of Noise damper | P | P | P | P | P | P | P | P | P |
| Air permeability of Noise damper [cm3/cm2/s] | 13.0 | 13.0 | 13.0 | 13.0 | 13.0 | 13.0 | 13.0 | 13.0 | 13.0 |
| Hardness of Noise damper (at −60 degrees Celsius under a 25% compression load) [kPa] | 110 | 90 | 76 | 62 | 50 | 90 | 90 | 90 | 90 |
| Number of Cells [/25 mm] | 65 | 65 | 65 | 65 | 65 | 60 | 55 | 38 | 30 |
| Ratio (v1/v2) between volume (v1) of Noise damper and Total volume (v2) of Tyre inner cavity [%] | 20 | 20 | 20 | 20 | 20 | 20 | 20 | 20 | 20 |
| Presence (P) or Absence (A) of Damping rubber body | A | A | A | A | A | A | A | A | A |
| Anti-noise performance [index] | 116 | 123 | 128 | 132 | 138 | 128 | 132 | 132 | 125 |
| Easiness of puncture repair [index] | 108 | 108 | 108 | 108 | 108 | 108 | 108 | 108 | 108 |
| Durability performance of Noise damper [index] | 120 | 115 | 110 | 105 | 100 | 115 | 115 | 115 | 115 |

|  | Ex. 16 | Ex. 17 | Ex. 18 | Ex. 19 |
|---|---|---|---|---|
| Presence (P) or Absence (A) of Noise damper | P | P | P | P |
| Air permeability of Noise damper [cm3/cm2/s] | 15.0 | 14.0 | 1.8 | 1.0 |
| Hardness of Noise damper (at −60 degrees Celsius under a 25% compression load) [kPa] | 90 | 90 | 90 | 90 |
| Number of Cells [/25 mm] | 65 | 65 | 65 | 65 |
| Ratio (v1/v2) between volume (v1) of Noise damper and Total volume (v2) of Tyre inner cavity [%] | 20 | 20 | 20 | 20 |
| Presence (P) or Absence (A) of Damping rubber body | A | A | A | A |
| Anti-noise performance [index] | 128 | 125 | 118 | 117 |
| Easiness of puncture repair [index] | 100 | 105 | 115 | 118 |
| Durability performance of Noise damper [index] | 100 | 100 | 100 | 100 |

From the test results, it was confirmed that the tyres in the Examples were able to decrease the running noise under the low temperature environment. Further, since the hardness of the noise damper was set in the preferred range, the tyres in the Examples were able to improve the durability performance of the noise damper. Furthermore, since the number of the cells was set in the preferred range, the tyres in the Examples were able to further decrease the running noise. Furthermore, since the air permeability of the noise damper was set in the preferred range, the tyres in the Examples were able to suppress the infiltration of the puncture repair liquid into the noise damper, therefore, it was possible that the puncture repair was performed easily.

The invention claimed is:

1. A pneumatic tyre comprising a noise damper made of a porous material and fixed to a tyre inner cavity surface, wherein
  the noise damper has a hardness of 62 kPa or more and 110 kPa or less under a 25% compression load measured in accordance with Japanese Industrial Standard JIS K6400-2 in an atmosphere of 60 degrees Celsius,
  the noise damper has closed cells,
  the number of the cells is 55 or less per 25 mm,
  an entire surface of the noise damper is uncovered and exposed to a tyre inner cavity except for the area fixed to the tyre inner cavity surface, and
  the exposed surface has a plurality of cells open to the tyre inner cavity.

2. The pneumatic tyre according to claim 1, wherein in the noise damper, the hardness under the 25% compression load measured in accordance with the Japanese Industrial Standard JIS K6400-2 in the atmosphere of 60 degrees Celsius is 90 kPa or less.

3. The pneumatic tyre according to claim 1, wherein the number of the cells is 51 or less per 25 mm.

4. The pneumatic tyre according to claim 1, wherein the number of the cells is 30 or more per 25 mm.

5. The pneumatic tyre according to claim 1, wherein the number of the cells is 38 or more per 25 mm.

6. The pneumatic tyre according to claim 1 further comprising a tread portion and a tread rubber arranged in the tread portion, wherein the tread rubber has a hardness of 55 degrees or more and 75 degrees or less.

7. The pneumatic tyre according to claim 1, wherein the noise damper has a hardness under the 25% compression load of 83 kPa or less.

8. The pneumatic tyre according to claim 1, wherein the noise damper has a hardness under the 25% compression load of 76 kPa or less.

9. The pneumatic tyre according to claim 1, wherein in the noise damper, air permeability measured in accordance with Japanese Industrial Standard JIS L1096 is 14 $cm^3/cm^2/s$ or less.

10. The pneumatic tyre according to claim 9, wherein the noise damper has an air permeability of 13 $cm^3/cm^2/s$ or less.

11. The pneumatic tyre according to claim 9, wherein the noise damper has an air permeability of 1.0 $cm^3/cm^2/s$ or more.

12. The pneumatic tyre according to claim 9, wherein the noise damper has an air permeability of 1.8 $cm^3/cm^2/s$ or more.

13. The pneumatic tyre according to claim 1, wherein a total volume of the noise damper is 0.1% or more and 20% or less of a total volume of a tyre inner cavity.

14. The pneumatic tyre according to claim 13, wherein the total volume of the noise damper is 10% or more of the total volume of the tyre inner cavity.

15. The pneumatic tyre according to claim 13, wherein the total volume of the noise damper is 15% or less of the total volume of the tyre inner cavity.

16. A pneumatic tyre comprising a noise damper made of a porous material and fixed to a tyre inner cavity surface, wherein
  the noise has a hardness of 62 kPa or more and 110 kPa or less under a 25% compression load measured in accordance with Japanese Industrial Standard JIS K6400-2 in an atmosphere of −60 degrees Celsius,
  an entire surface of the noise damper is uncovered and exposed to a tyre inner cavity except for the area fixed to the tyre inner cavity surface, and
  the exposed surface has a plurality of cells open to the tyre inner cavity.

* * * * *